(12) United States Patent
Nezu et al.

(10) Patent No.: US 8,442,761 B2
(45) Date of Patent: May 14, 2013

(54) NAVIGATION DEVICE, DISPLAY METHOD OF NAVIGATION DEVICE, PROGRAM OF DISPLAY METHOD OF NAGIVATION DEVICE AND RECORDING MEDIUM RECORDING PROGRAM OF DISPLAY METHOD OF NAVIGATION DEVICE

(75) Inventors: Yoshiyuki Nezu, Tokyo (JP); Kaori Kashimoto, Kanagawa (JP); Toshiharu Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 453 days.

(21) Appl. No.: 12/552,710

(22) Filed: Sep. 2, 2009

(65) Prior Publication Data
US 2010/0057344 A1  Mar. 4, 2010

(30) Foreign Application Priority Data
Sep. 3, 2008  (JP) ................... 2008-225548

(51) Int. Cl.
G01C 21/00  (2006.01)
(52) U.S. Cl.
USPC .......................................... 701/433
(58) Field of Classification Search .............. None
See application file for complete search history.

(56) References Cited

U.S. PATENT DOCUMENTS

| 6,201,803 | B1 | 3/2001 | Munday et al. | |
|---|---|---|---|---|
| 6,487,305 | B2 | 11/2002 | Kambe et al. | |
| 2001/0040984 | A1 | 11/2001 | Kambe et al. | |
| 2004/0044477 | A1* | 3/2004 | Jung et al. | 702/5 |
| 2007/0002813 | A1 | 1/2007 | Tenny et al. | |
| 2008/0154499 | A1 | 6/2008 | Tanaka et al. | |
| 2008/0281515 | A1* | 11/2008 | Ann et al. | 701/210 |
| 2009/0082967 | A1* | 3/2009 | Hara et al. | 701/225 |
| 2009/0088969 | A1* | 4/2009 | Oota | 701/208 |
| 2009/0271109 | A1* | 10/2009 | Lee et al. | 701/208 |

FOREIGN PATENT DOCUMENTS

| CN | 1169565 A | 1/1998 |
|---|---|---|
| CN | 1189960 A | 8/1998 |
| CN | 101236699 A | 8/2008 |

(Continued)

OTHER PUBLICATIONS

English translation of Chinese Office Action issued Aug. 30, 2012 in connection with Chinese Application No. 200910172014.0.

(Continued)

*Primary Examiner* — Thomas Tarcza
*Assistant Examiner* — Adam Alharbi
(74) *Attorney, Agent, or Firm* — Wolf, Greenfield & Sacks, P.C.

(57) ABSTRACT

There is provided a navigation device having a current location detection unit for detecting a current location, a current location correction unit for correcting the current location detected by the current location detection unit using map matching and a display unit for displaying a map, switches an operation mode between a normal mode, which is an operation mode based on in-vehicle use, and a pedestrian mode, which is an operation mode based on use when moving on foot, displays the map of the current location by the display unit by arranging a mark indicating the current location based on the current location corrected by the current location correction unit in the normal mode, and displays the map of the current location by the display unit by arranging the mark indicating the current location based on the current location detected by the current location detection unit in the pedestrian mode.

9 Claims, 7 Drawing Sheets

FOREIGN PATENT DOCUMENTS

| | | |
|---|---|---|
| CN | 101248626 A | 8/2008 |
| JP | 58-129313 | 8/1983 |
| JP | 05-280991 A | 10/1993 |
| JP | 2000-018960 A | 1/2000 |
| JP | 2001-108457 A | 4/2001 |
| JP | 2001-256598 A | 9/2001 |
| JP | 2002-139343 A | 5/2002 |
| JP | 2002-174523 A | 6/2002 |
| JP | 2003-050133 A | 2/2003 |
| JP | 2003-166845 A | 6/2003 |
| JP | 2003-202229 A | 7/2003 |
| JP | 2003-214874 A | 7/2003 |
| JP | 2003-214875 A | 7/2003 |
| JP | 2003-240565 A | 8/2003 |
| JP | 2005-345115 A | 12/2005 |
| JP | 2006-214826 A | 8/2006 |
| JP | 2006-275564 A | 10/2006 |

OTHER PUBLICATIONS

English translation of Chinese Office Action issued Dec. 20, 2011 in connection with Chinese Application No. 200910172014.0.

* cited by examiner

NAVIGATION DEVICE, DISPLAY METHOD OF NAVIGATION DEVICE, PROGRAM OF DISPLAY METHOD OF NAGIVATION DEVICE AND RECORDING MEDIUM RECORDING PROGRAM OF DISPLAY METHOD OF NAVIGATION DEVICE

BACKGROUND OF THE INVENTION

1. Field of the Invention

The present invention relates to a navigation device, a display method of the navigation device, a program of the display method of the navigation device, and a recording medium recording the program of the display method of the navigation device, and may be applied to a car navigation device, which may be used as a personal navigation device (PND), for example. The present invention displays a map in which a mark of a current location is arranged on a current location corrected using map matching in a normal mode, and displays the map in a manner that the correction by the map matching is stopped in a pedestrian mode, thereby preventing an erroneous display of the current location when used as the PND.

2. Description of the Related Art

In related art, a car navigation device detects the current location using a global positioning system (GPS) and displays the detected current location on a map display. However, it is difficult to prevent occurrence of error in the detection of the current location by the GPS. On the other hand, the car navigation device is based on in-vehicle use. Then, the car navigation device corrects the current location detected by the GPS using map matching processing using road information stored in map data for display, thereby preventing an unnatural display of the current location such as running through a housing site or the like. For example, the map matching is disclosed in Japanese Patent Application Laid-Open No. S58-129313.

Also, the car navigation device detects a running direction based on temporal change in the current location, and displays the map by appropriately changing a direction of the display such that an upward direction is a traveling direction. Also, the current location is displayed on the map display by using a mark evoking the traveling direction such as a triangle or an arrow. Thereby, the car navigation device displays the map and the current location such that the current location and the traveling direction may be intuitively grasped.

Also, the car navigation device holds location information on various shops and facilities, which might be expected to be used by the user, such as gas stations, restaurants and the like classified according to categories, and displays the various shops and facilities on the map in response to an operation of the user. Also, the navigation processing is executed by searching a route to the shops and facilities according to an indication of the user.

Recently, as the car navigation device, a portable device, which may be detached from the vehicle and used as the PND, is provided.

SUMMARY OF THE INVENTION

A case of using the car navigation device as the PND includes a case in which the user carries the same to use. Therefore, spots other than roads on which a vehicle runs, such as a site of various facilities and a pedestrian walk, may become the current location. Therefore, in the car navigation device, which corrects the current location by the map matching based on the in-vehicle use, there is a possibility that the current location is displayed in error.

The present invention is made in view of the above-described circumstances, and it is desirable to provide a navigation device capable of preventing the erroneous display of the current location when used as the PND, a display method of the navigation device, a program of the display method of the navigation device, and a recording medium for recording the program of the display method of the navigation device.

According to an embodiment of the present invention, there is provided a navigation device, including: a current location detection unit for detecting a current location; a current location correction unit for correcting the current location detected by the current location detection unit using map matching; and a display unit for displaying a map, wherein the navigation device switches an operation mode between a normal mode being an operation mode based on in-vehicle use and a pedestrian mode being an operation mode based on use when moving on foot, displays the map of the current location in the display unit by arranging a mark indicating the current location based on the current location corrected by the current location correction unit in the normal mode, and displays the map of the current location in the display unit by arranging the mark indicating the current location based on the current location detected by the current location detection unit in the pedestrian mode.

According to such a configuration, in the normal mode based on the in-vehicle use, it is possible to display the current location detected by the current location detection unit by correcting the same onto a road on which a vehicle runs using the map matching. Therefore, it is possible to prevent an unnatural display of the current location such as running through a housing site in the normal mode. Also, in the pedestrian mode based on the use when moving on foot, it is possible to prevent an erroneous display of the current location, which displays the current location on a road on which a vehicle runs when the correct current location is not on the road on which a vehicle runs, by stopping the map matching processing to display the current location.

The navigation device may include: traveling direction detecting means for detecting a traveling direction based on change of the current location detected by the current location detection unit, or change of the current location corrected by the current location correction unit, and the navigation device may change a direction of the map based on the traveling direction detected by the traveling direction detecting means, and hold the direction on the map corresponding to the traveling direction detected by the traveling direction detecting means in an upward direction of the display screen in the normal mode, and stop changing the direction of the map according to the traveling direction, and changes the direction of the map in response to the operation of the user for display in the pedestrian mode.

A mark indicating the current location in the normal mode may be a mark indicating the traveling direction, and a mark indicating the current location in the pedestrian mode may be a mark without directionality.

The navigation device may receive setting of a destination in the pedestrian mode, and display a mark indicating the destination on the map and displays a distance from the current location to the destination.

The navigation device may receive setting of a plurality of destinations in the pedestrian mode, display a mark indicating the destination on the map, and sequentially select the plurality of destinations, sets the selected destination to be identifiable from other destinations, and display a distance to the selected destination.

The navigation device may receive setting of a plurality of destinations in the pedestrian mode, sequentially select the plurality of destinations, and change a scale, a direction and a display location of the map, and display the map by arranging a mark indicating the selected destination and a mark indicating the current location on positions on both ends in a longitudinal direction of a display screen.

The navigation device may receive setting of a plurality of destinations in the pedestrian mode, alternately execute a separate display of the plurality of destinations and an entire display of the plurality of destinations, in the separate display: sequentially may select the plurality of destinations, change a scale, a direction and a display location of the map, and display the map by arranging a mark indicating the selected destination and a mark indicating the current location on positions on both ends in a longitudinal direction of the display screen, and in the entire display: may change the scale, the direction and the display location of the map, and display the marks indicating the plurality of destinations and the current location on the display screen.

According to another embodiment of the present invention, there is provided a display method of a navigation device having a current location detection unit for detecting a current location, a current location correction unit for correcting the current location detected by the current location detection unit using map matching, and a display unit for displaying a map, the method including: an operation mode switching step of switching an operation mode of the display unit between a normal mode being an operation mode based on in-vehicle use and a pedestrian mode being an operation mode based on use when moving on foot; a normal mode map displaying step of displaying the map of the current location by the display unit by arranging a mark indicating the current location based on the current location corrected by the current location correction unit in the normal mode; and a pedestrian mode map displaying step of displaying the map of the current location by the display unit by arranging the mark indicating the current location based on the current location detected by the current location detection unit in the pedestrian mode.

According to another embodiment of the present invention, there is provided a program of a display method of a navigation device, wherein the navigation device has a current location detection unit for detecting a current location, a current location correction unit for correcting the current location detected by the current location detection unit using map matching, a display unit for displaying a map, and a calculation unit for executing the program of the display method to control operation of each unit, and the program of the display method has an operation mode switching step of switching an operation mode of the display unit between a normal mode being an operation mode based on in-vehicle use and a pedestrian mode being an operation mode based on use when moving on foot, a normal mode map displaying step of displaying the map of the current location by the display unit by arranging a mark indicating the current location based on the current location corrected by the current location correction unit in the normal mode, and a pedestrian mode map displaying step of displaying the map of the current location by the display unit by arranging the mark indicating the current location based on the current location detected by the current location detection unit in the pedestrian mode.

According to another embodiment of the present invention, there is provided a recording medium for recording a program of a display method of a navigation device, wherein the navigation device has a current location detection unit for detecting a current location, a current location correction unit for correcting the current location detected by the current location detection unit using map matching, a display unit for displaying a map, and a calculation unit for executing the program of the display method to control operation of each unit, and the program of the display method has an operation mode switching step of switching an operation mode of the display unit between a normal mode being an operation mode based on in-vehicle use and a pedestrian mode being an operation mode based on use when moving on foot, a normal mode map displaying step of displaying the map of the current location by the display unit by arranging a mark indicating the current location based on the current location corrected by the current location correction unit in the normal mode, and a pedestrian mode map displaying step of displaying the map of the current location by the display unit by arranging the mark indicating the current location based on the current location detected by the current location detection unit in the pedestrian mode.

According to the embodiments of the present invention described above, it is possible to prevent an erroneous display of the current location when used as the PND.

DETAILED DESCRIPTION OF THE PREFERRED EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments of the present invention will be described in detail with appropriate reference to drawings. The description will be given in the following order.
1. First Embodiment
2. Second Embodiment
3. Variation
[First Embodiment]
[Entire Configuration]

Figure 2:
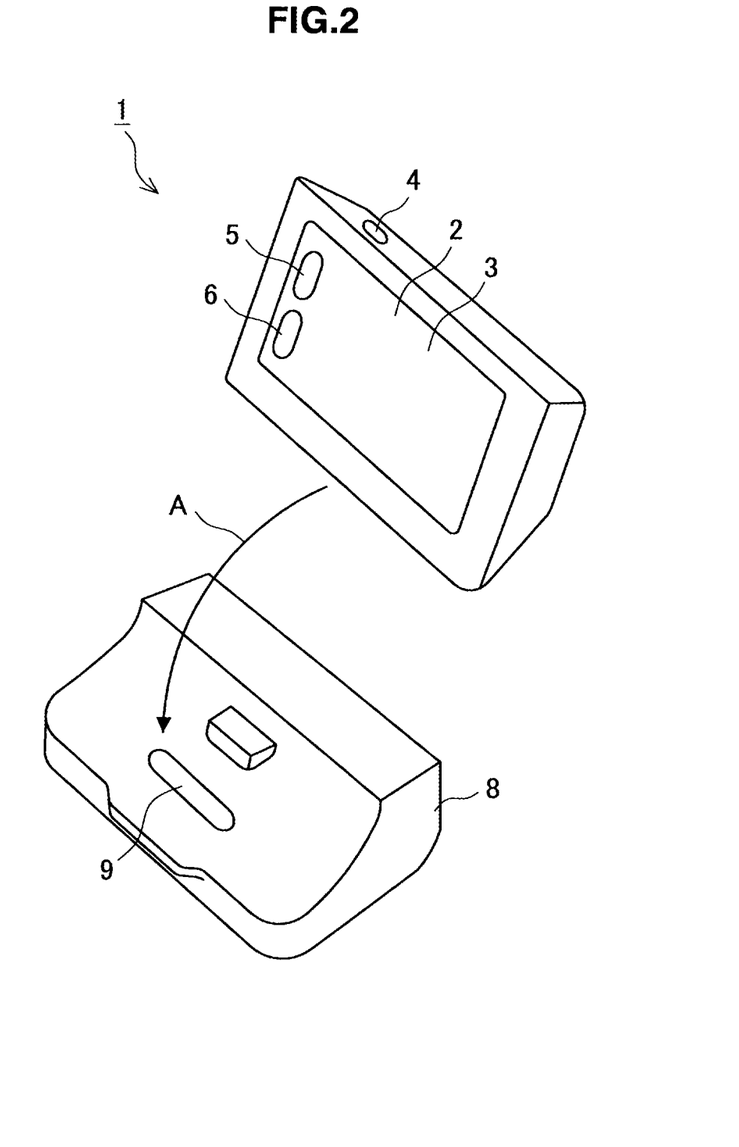
FIG. 2 is a perspective view showing the navigation device according to the first embodiment of the present invention.

FIG. 2 is a perspective view showing a navigation device according to the first embodiment of the present invention. The navigation device 1 is a car navigation device, which can be used as a PND. The navigation device 1 displays a map of a current location in response to an operation of a user, and performs navigation processing. In the navigation device 1, a display screen 2 for displaying the map, menus of various operations and the like is provided in front thereof, and a touch panel 3 for detecting the operation of the user is provided on a front surface of the display screen 2. Also, in the navigation device 1, a speaker is provided on a side thereof, and a power switch 4 is provided on an upper end face thereof. In addition, in the navigation device 1, a menu button 5 for instructing to display the menu, and a current location button 6 for instructing to display the current location are provided on a left end of the display screen 2.

In addition, the navigation device 1 operates by a built-in battery for portable use. Also, the navigation device 1 is structured to be placed on a cradle 8 as indicated by an arrow A of use in a vehicle or the like. The cradle 8 is fixed on a dashboard or the like of the vehicle and detachably holds the navigation device 1 in a concave portion thereof. When placed on the cradle 8, the navigation device 1 operates by power or the like supplied from the cradle 8. For this purpose, a terminal 9 for supplying the navigation device 1 with the power is provided on the cradle 8.

Figure 3:
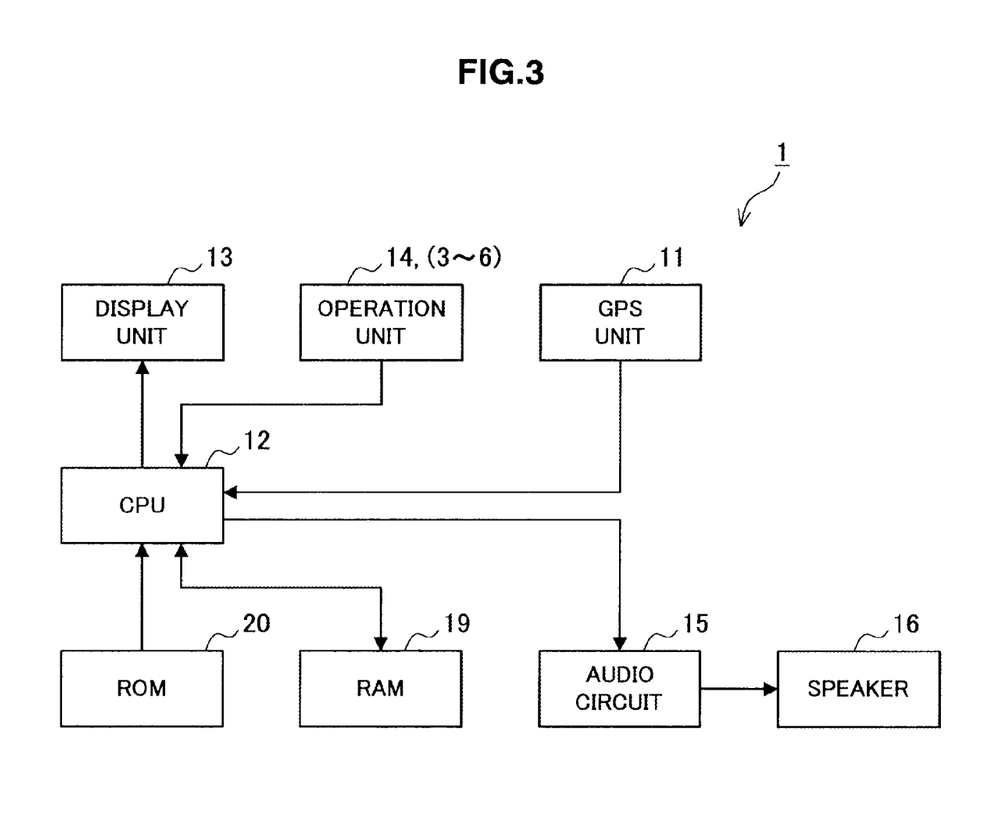
FIG. 3 is a block diagram of the navigation device shown in FIG. 2.

FIG. 3 is a block diagram showing a configuration of the navigation device 1. Herein, a GPS unit 11, which is a current location detection unit for detecting the current location, receives and processes electric waves coming from a GPS satellite, and detects the current location to notify a central processing unit 12.

A display unit 13 includes, for example, a thin film transistor-liquid crystal display (TFT-LCD), and forms the display screen 2 described above with reference to FIG. 2. The display unit 13 displays the map, the menus of the various operations and the like by control of the central processing unit 12.

An operation unit 14, which includes the touch panel 3 arranged on the display screen 2, the power switch 4, the menu button 5, the current location button 6 and the like, detects the operation of the user to notify the central processing unit 12.

A audio circuit 15 processes voice data and audio data output from the central processing unit 12 to drive a speaker 16 by voice signals and audio signals, which are the processing results. A random access memory (RAM) 19 constitutes a work area of the central processing unit 12. A read only memory (ROM) 20 stores and holds a program of the central processing unit 12, map data necessary for executing the program and the like. Although the program and the various data of the read only memory 20 are provided by being installed in the navigation device 1 in advance, they may alternatively be provided by being recorded in a recording medium such as an optical disk, a magnetic disk and a memory card, or may be provided by being downloaded via a network such as the Internet.

The central processing unit 12, which is a control unit for controlling operation of the entire navigation device 1, controls the operation of the entire navigation device 1 by securing the work area in the random access memory 19 and executing the program recorded in the read only memory 20. The central processing unit 12 starts up the entire operation in response to an operation of the power switch 4 by control of each unit by the execution of the program. At this time, the central processing unit 12 starts up the entire operation by the built-in battery when the power is not supplied from the cradle 8.

The central processing unit 12 displays a top menu screen in response to an operation of the menu button 5 to display a menu relating to the navigation, a menu to reproduce audio data and video data, and a menu of various settings. When the menu to reproduce audio data and video data is selected on the top menu screen, the central processing unit 12 opens a submenu to receive an operation of the user, and reproduces the audio data and the video data recorded in the memory card not shown to provide to the user.

Also, when the menu of various settings is selected on the top menu screen, the central processing unit 12 opens a submenu to receive an operation of the user and receives the various settings in response to the operation of the user. Also, on the top menu screen, when the menu relating to the navigation is selected, the central processing unit 12 opens a submenu to receive an input of a destination by a phone number, an address or the like, and thereafter executes route search processing. Also, the central processing unit 12 starts the navigation processing for a route searched based on the route search result and current location information obtained by the GPS unit 11.

On the other hand, when the current location button 6 is operated, the central processing unit 12 displays the map of the current location on the display screen 2. The central processing unit 12 may also receive an input of the destination by an operation of the user on the display of the map to execute the route search processing and the navigation processing. Also, when the central processing unit 12 starts the navigation processing, it displays the map of the current location on the display screen 2, displays a route guide on the display screen 2, and further announces the route guide by text, or by both text and voice.

[Map Display in Normal Mode]

Figure 4A:
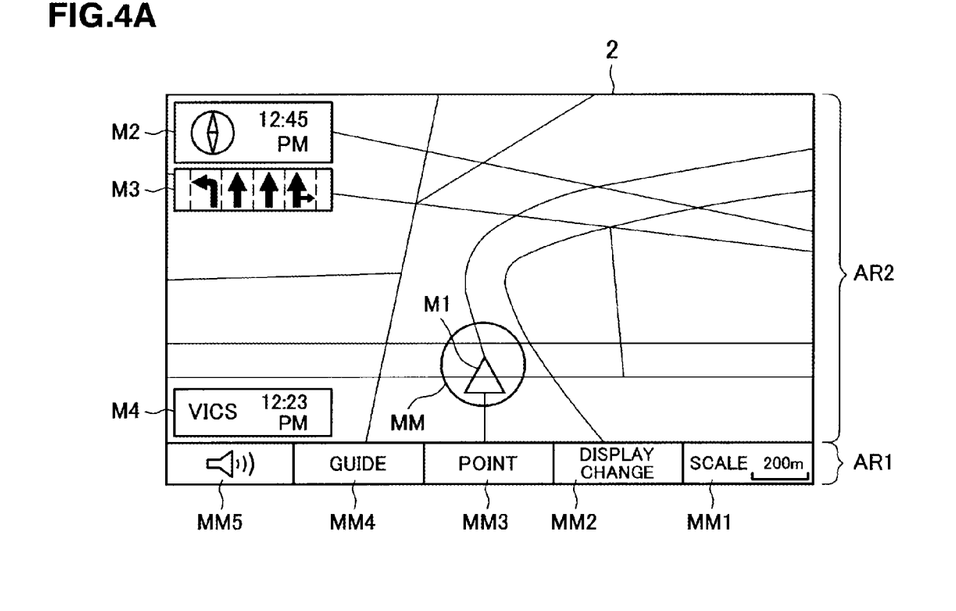
FIG. 4 is a plan view showing the display screen in a normal mode of the navigation device shown in FIG. 2.

FIG. 4 is a plan view showing the display screen in a normal mode when the current location button 6 is operated. Herein, the normal mode is an operation mode based on in-vehicle use. The central processing unit 12 sets a belt-like menu display area AR1 along a bottom side of the display screen. The central processing unit 12 sets a remaining area other than the menu display area AR1 as a map display area AR2 and displays the map of the current location on the map display area AR2.

The central processing unit 12 displays a mark M1 indicating the current location and the traveling direction on a lower potion of the map display area AR2, substantially in the center in the horizontal direction. As the mark M1, a mark having directionality, which allows the user to recognize that a specific direction is a significant direction, the mark allowing the user to recognize that the specific direction is the traveling direction, is applied. Specifically, in this embodiment, the mark M1 has a triangular shape with an apex on an upper side, and the display location is set as the current location and a direction of the apex is set in the traveling direction.

The central processing unit 12 makes up the display screen using the map data stored in the read only memory 20. Also, by map matching processing using road information stored in the map data, the mark M1 is displayed by correcting the current location detected by the GPS, to prevent an unnatural display of the current location such as running through a housing site. Also, the traveling direction is detected based on temporal change in the current location corrected by the map matching processing. Alternatively, the traveling direction may be detected based on change of the current location detected by the GPS unit 11. For the map matching processing, various methods such as a method of simply correcting the current location to a location on a road the closest to the current location detected by the GPS, and a method of correcting the current location detected by the GPS on the assumption that a traveled route having the smallest error relative to the traveled route drawn by the current locations detected by the GPS so far is the correct traveled route may be applied.

The central processing unit 12 allows the direction of the map to be variable in response to the change of the traveling direction at a constant time interval such that the traveling direction is in an upward direction on the display screen in the map display of the current location. Thereby, the central processing unit 12 displays the map such that a passenger who sits on a seat and faces the traveling direction may intuitively grasp the current location and the traveling direction. Also, the central processing unit 12 scrolls the map display in response to the change of the current location, and holds the mark M1 of the current location on the lower portion of the map display area AR2, substantially in the center in the horizontal direction. The central processing unit 12 displays a display M2 of a direction and a current time, a display M3 of information on lanes of the road on which the vehicle is running, a mark M4 relating to acquisition of traffic information and the like together for convenience of the user.

The central processing unit 12 displays menus MM1 to MM5 of "scale", "display change", "point", "guide", and "sound volume" in the menu display area AR1. The menu MM1 of "scale" is a menu for changing the scale of the map display, and a current scale is displayed on the menu. The central processing unit 12 displays a submenu for increasing and decreasing the scale in response to the selection of the menu MM1, and changes the scale of the map in response to an operation on the submenu.

Also, the menu MM2 of "display change" is a menu for switching a display mode of the map. The central processing unit 12 displays a submenu for selecting the display mode in response to the selection of the menu MM2, and switches the display mode in response to an operation of the user. The switching of the display mode is to switch between the display mode shown in FIG. 4 and the display mode for use on an expressway.

Also, the menu MM3 of "point" is a menu for switching between display and non-display of the marks of various shops and facilities on the map. The central processing unit 12 displays a submenu in response to an operation of the menu MM2. The central processing unit 12 displays the marks of the shops and facilities or stops displaying the marks of the shops and facilities according to the operation of the submenu.

The menu MM5 of "sound volume" is a menu for changing or muting a sound volume of voice guidance. The central processing unit 12 displays a submenu to receive an operation of the user in response to the operation on this menu, and changes or mutes the sound volume.

Figure 4B:
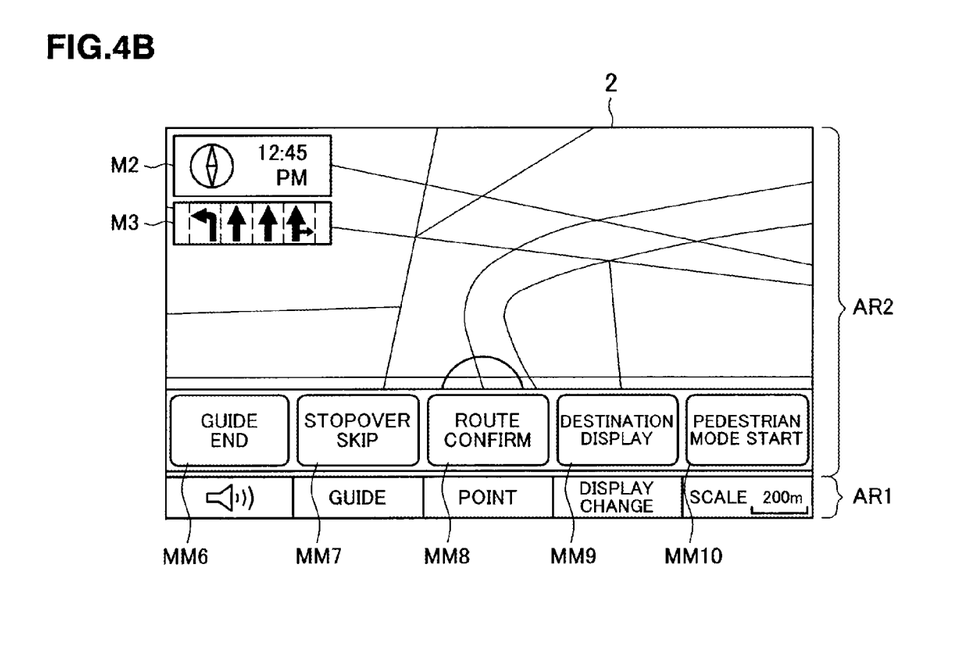

On the other hand, the menu MM4 of "guide" is a menu for switching the guide on the map display. The central processing unit 12 displays submenus MM6 to MM10 of "guide end", "stopover skip", "route confirm", "destination display", and "pedestrian mode start", respectively, as shown in FIG. 4B, in response to the operation on the menu MM4. The submenus MM6 to MM9 out of the submenus MM6 to MM10 are selectable only when executing the navigation processing. Therefore, when the map is displayed in response to the operation of the current location button 6 in a state in which the navigation processing is not executed, the central processing unit 12 displays the submenus MM6 to MM9 with a lowered brightness level, and informs the user that it is difficult to select the menus.

On the other hand, the menu MM10 of "pedestrian mode start" is a menu for switching the map display to the map display in the pedestrian mode. Herein, the pedestrian mode is an operation mode based on portable use detached from the cradle. The central processing unit 12 displays the submenu MM10 to be selectable only at the time of operation by the built-in battery. Therefore, at the time of operation by the power from the cradle 8, the central processing unit 12 displays the submenu MM10 with the lowered brightness level such that the user may grasp difficulty of selection. The central processing unit 12 switches the map display to the display in the pedestrian mode in response to the selection of the submenu MM10.

Even when executing the navigation processing, the central processing unit 12 executes the map display similar to the map display shown in FIG. 4, and switches the display to the pedestrian mode in response to the operation of the menu MM4 of "guide" and the menu MM10 of "pedestrian mode start". In a case of the map display in the navigation processing, the central processing unit 12 displays additional information such as a route to the destination and distance to a point to make a turn in addition to the map display shown in FIG. 4.

[Map Display in Pedestrian Mode]

Figure 1A:
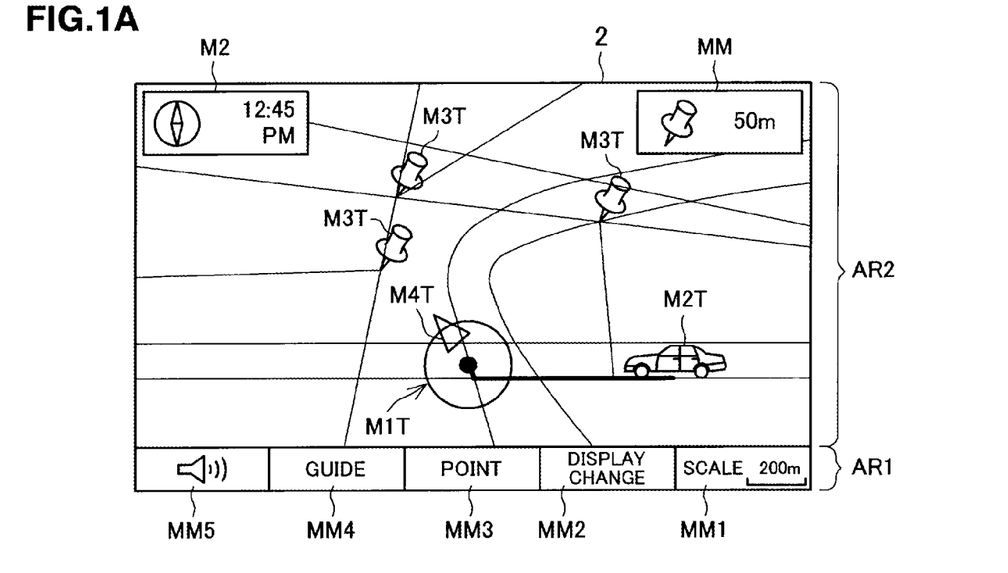
FIG. 1 is a plan view showing a display screen in a pedestrian mode of a navigation device according to a first embodiment of the present invention.

FIG. 1 is a plan view showing the map display in the pedestrian mode. Herein, in the map display in the pedestrian mode, the menu display area AR1 and the map display area AR2 are provided as in the case of the map display in the normal mode. Also, the menus MM1 to MM5 of "scale", "display change", "point", "guide" and "sound volume", respectively, are displayed in the menu display area AR1 as in the case of the map display in the normal mode.

The central processing unit 12 starts the map display of the current location in the map display area AR2 with the same scale and direction as those of the map display in the normal mode just before switching to the pedestrian mode. Also, the central processing unit 12 displays the map of the current location by setting the current location on the lower portion of the map display area AR2, substantially in the center in the horizontal direction, as in the case of the normal mode. Also, a mark M1T indicating the current location is displayed on the current location. Thereby, the current location may be intuitively grasped even when the display is switched between the normal mode and the pedestrian mode. In this case, the map may be displayed in a manner that the current location is in the center of the map display area AR2 or the map may be displayed such that north is on an upward direction.

The pedestrian mode, the central processing unit 12 stops the map matching processing and displays the mark M1T of the current location according to the current location information detected by the GPS unit 11. In this case, detection accuracy of the current location may be improved by increasing the number of repetitions of calculation for detecting the current location by the GPS unit 11, time averaging of the current locations detected by the GPS unit 11, and the like. Also, in the pedestrian mode, the central processing unit 12 stops the process to change the direction of the map such that the traveling direction is in the upward direction. In addition, the central processing unit 12 stops the process to hold the mark M1T of the current location at a fixed location and moves the map display in response to an operation of the user on the touch panel 3.

The central processing unit 12 changes a design of the mark M1T of the current location for display in the pedestrian mode from the mark M1 of the current location in the normal mode. More specifically, the central processing unit 12 displays the current location by the mark M1T without the directionality, which does not allow the user to recognize that a specific direction is a significant direction. A simplest mark with a certain size as the mark, which does not allow the user to recognize that a specific direction is a significant direction, is a circular shape in which all parts are rotationally symmetric about the center. Therefore, in this embodiment, a circular outline with a point arranged on the center is applied as the mark M1T. The central processing unit 12 displays the mark M1T by setting the point on the center of the mark M1T as the current location. As the mark M1T of the current location without the directionality, wide variety of shapes such as polygonal shapes having four or more apexes, for example, a square shape and a hexagonal shape, further, a star-shape, a heart-shape, and a bilaterally symmetrical character may be applied.

Also, the central processing unit 12 displays a mark M2T indicating a start point on a point at which it is switched to the pedestrian mode. Alternatively, the mark M2T indicating the start point may be displayed on the current location at which the power supply from the cradle 8 is stopped in place of the point at which it is switched to the pedestrian mode. Also, the central processing unit 12 displays the traveled route from the start point to the current location as indicated by a bold line in FIG. 1.

Also, the central processing unit 12 displays an icon M3T as a marker on the destination set by the user in the pedestrian mode. Also, the central processing unit 12 displays a mark M4T indicating a direction of the destination indicated by the user on a position on which the mark M1T of the current location is displayed. Also, as indicated by a symbol MM, linear distance to the destination relating to the mark M4T is displayed on a right upper corner of the screen together with the mark M3T indicating the destination.

The central processing unit 12 displays the submenu to receive the operation of the user in response to the operation on the menu MM of "sound volume" as in the case of the map display in the normal mode.

Figure 1B:
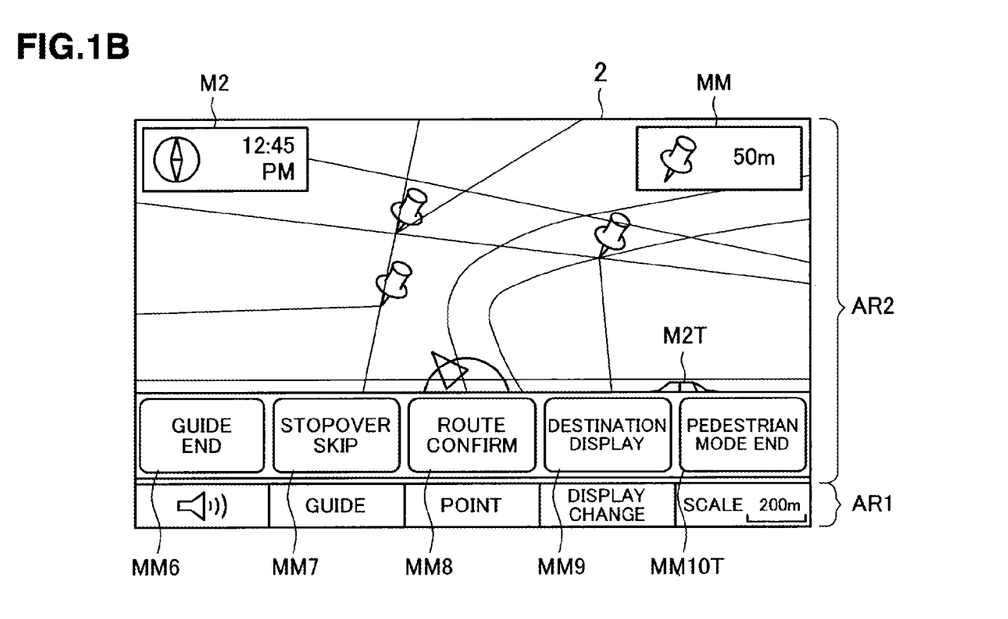

On the other hand, when the menu MM4 of "guide" is operated, the submenus MM6 to MM9 and MM10T of "guide end", "stopover skip", "route confirm", "destination display" and "pedestrian mode end", respectively, are displayed, as shown in FIG. 1B. At this time, the central processing unit 12 displays the submenus MM6 to MM9 out of the submenus MM6 to MM9 and MM10T with the lowered brightness level so as not to receive the operation of the user. On the other hand, when the submenu MM10T of "pedestrian mode end" is operated, the map display is switched to the display in the normal mode. Similarly, the central processing unit 12 also switches the operation from the pedestrian mode to the normal mode when start of the power supply from the cradle 8 is detected and placement on the cradle 8 is detected.

Figure 5:
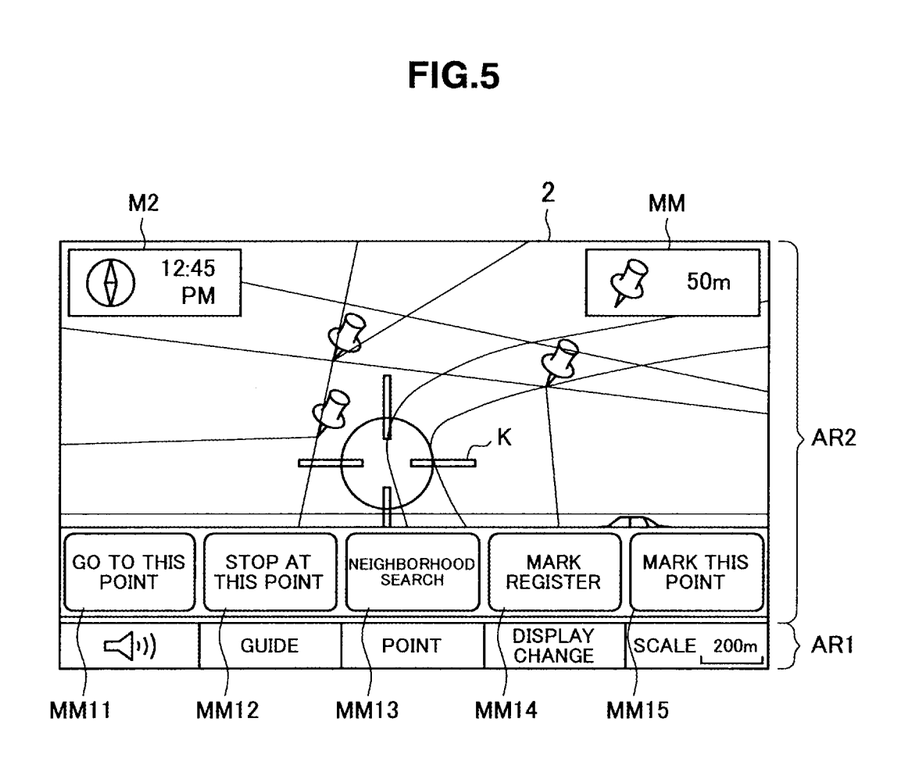
FIG. 5 is a plan view showing the display screen when a menu of "guide" is operated in the pedestrian mode shown in FIG. 1.

On the other hand, when the menu MM3 of "point" is operated, the central processing unit 12 displays submenus MM11 to MM15 of "go to this point", "stop at this point", "neighborhood search", "mark register", and "mark this point", respectively, as shown in FIG. 5. The submenus MM11 to MM15 are also displayed when the menu MM3 of "point" is operated on the map display in the normal mode.

Out of the submenus MM11 to MM15, the submenus MM11 and MM12 of "go to this point" and "stop at this point", respectively, are menus for inputting the destination and stopover of the navigation processing on the map display in the normal mode, and they are set to be difficult to select and displayed with the lowered brightness level in the pedestrian mode.

On the other hand, the submenu MM13 of "neighborhood search" is a menu for searching the shops, facilities and the like indicated by the user. When the menu MM13 is selected, the central processing unit 12 displays a predetermined submenu to receive the input of a search target, and thereafter searches the record of the read only memory 20. The central processing unit 12 displays locations of the shops, facilities and the like indicated by the user on the map based on the search result.

On the other hand, the submenu MM14 of "mark register" is a menu for registering the search target for the submenu MM13 of "neighborhood search". When the submenu MM14 is selected, the central processing unit displays a cursor on the map to receive the input of a registration site, and then receives the input of a name, a category and the like to be registered.

On the other hand, the submenu MM15 of "mark this point" is a menu for receiving setting of the mark M3T as the marker. The central processing unit 12 displays a cursor K in response to the selection of the submenu MM15, to receive the input of the destination on which the marker is set. The submenu MM15 of "mark this point" is set to be difficult to select on the map display in the normal mode, and is displayed with the lowered brightness level. Therefore, the destination relating to the mark M3T as the marker is the destination set only in the pedestrian mode.

On the other hand, the menu MM4 of "display change" is a menu for instructing to switch the mark M4T indicating the direction to the destination and the distance display MM. When the menu MM4 is operated, the central processing unit 12 sequentially selects the destinations in the increasing order of the linear distance from the current location. Also, the central processing unit 12 changes the mark M4T to the direction to the selected destination and sets the selected destination to be identifiable. Also, the central processing unit 12 switches the distance display MM according to the setting of the mark M4T. In this case, the display of the destination indicating the direction by the mark M4T may be set to be identifiable by switching the same to blinking display or the like.

Figure 6:
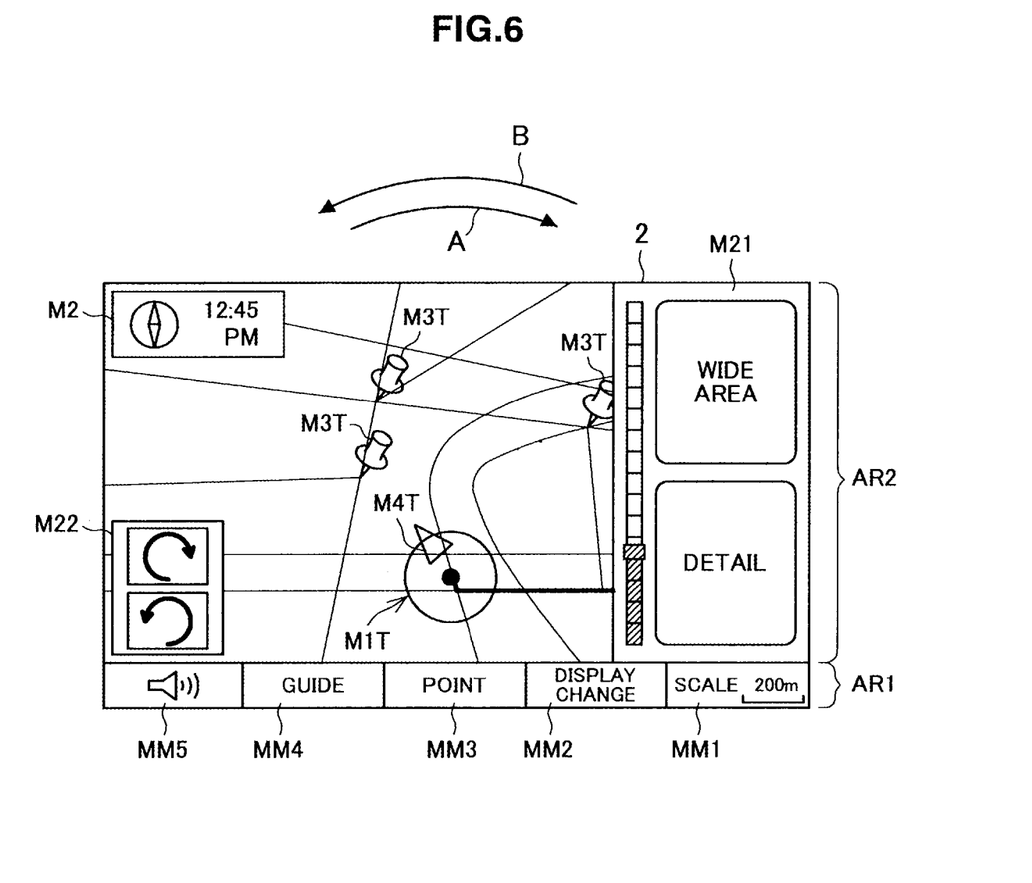
FIG. 6 is a plan view showing the display screen when a menu of "scale" is operated in the pedestrian mode shown in FIG. 1.

On the other hand, when the menu MM1 of "scale" is selected, the central processing unit 12 displays a submenu M21 of "switch scale" and a submenu M22 of "rotate display", as shown in FIG. 6. Herein, the submenu M21 of "switch scale" includes a menu of "wide area" to switch the map display to a wide area display, a menu of "detail" to switch the map display to a detailed display, and a display of a bar graph indicating the current scale. The central processing unit 12 changes the scale of the map display in response to the selection of the menu of "wide area" and the menu of "detail" and switches the display of the bar graph.

On the other hand, the submenu M22 of "rotate display" includes a menu to rotate the map in a clockwise direction and a menu to rotate the map in a counterclockwise direction. The central processing unit 12 rotates the map display in the clockwise direction or in the counterclockwise direction about the current location as indicated by arrows A and B, respectively, in response to the operation of the menus arranged in the submenu M22.

[Operation of Embodiment]

In the above-described configuration, the navigation device 1 receives the input of the destination by the operation of the user to execute the route search processing and thereafter executes the navigation processing. In the navigation device 1, the navigation processing is executed by displaying the map of the current location on the display screen 2 of the display unit 13 (FIGS. 2 to 4). Thereby, the user may confirm the current location and the route to the destination on the map and arrive at the desired destination without problem.

Also, on the map display in the navigation processing (FIG. 4), the current location is displayed by correcting the location information on the current location obtained by the GPS unit 11 using the map matching method, and an unnatural display of the current location such as running through a housing site is prevented. Also, in the display of the map, the map is scrolled according to change of the current location so as to hold the current location on the lower portion of the map display area AR2, substantially in the center in the horizontal direction, and further the map is rotated such that the traveling direction detected based on the change of the current location is in the upward direction on the screen. Thereby, in the navigation device 1, the map display is appropriately changed such that the passenger who sits on the seat and faces the front of the vehicle may intuitively grasp the current location, the traveling direction and the neighborhood of the current location. Thereby, usability for the user in navigation of the navigation device 1 is improved.

Also, in the navigation device 1, the map of the vicinity of the current location is similarly displayed also when the user instructs to display the current location, which also improves the usability for the user in this case.

at the time of arriving at the destination using the navigation by the navigation device 1, a case of visiting sight seeing spots in the neighborhood of the destination other than the destination on foot may be expected. Also, when the destination is facilities dotted in a vast site, into which it is difficult for the vehicle to enter, the various facilities dotted in the vast site will be visited on foot.

Since the navigation device 1 operates by the battery when detached from the cradle 8, it is possible to display the map of the current location by being carried during such movement on foot (FIGS. 1 and 2). Thereby, in the navigation device 1, it is possible to appropriately confirm the current location, the desired destination and the like during the movement on foot, thereby further improving the usability for the user.

However, if the map is simply displayed with the configuration for in-vehicle use, this might cause significant confusion to the user. That is to say, in the normal mode, the navigation device 1 corrects the current location by the map matching processing based on the in-vehicle use, and prevents an unnatural display of the current location such as running through a housing site. On the other hand, when moving on foot, the movement is not necessarily on the road on which a vehicle runs, and movement across a park or the like and movement within a station are possible. Therefore, if the current location simply displayed based on the in-vehicle usage, there is a case in which the current location is displayed in error.

Also, in the movement on foot, a movement speed is significantly slow relative to the movement with a vehicle. Therefore, in the movement on foot, accuracy of the traveling direction detected based on the change of the current location is significantly lowered relative to a case of moving with the vehicle. Therefore, if the traveling direction is detected based on the change of the current location and the direction of the map display is changed such that the traveling direction is in the upward direction as in the case of the in-vehicle use, a case in which the direction of the map is displayed in error by erroneous detection of the traveling direction might occur.

Therefore, in this embodiment, when the user instructs to display in the pedestrian mode in a state being detached from the vehicle, the current location is displayed on the map in the pedestrian mode. Also, in the map display, the map matching processing is stopped and the mark M1T indicating the current location is displayed based on the current location detected by the GPS unit 11. Thereby, in this embodiment, an erroneous display of the current location when used as the PND may be effectively prevented.

Also, the map display is executed by changing the mark M1T indicating the current location in the map display in the normal mode, which is the previous map display, to the mark M1T indicating the current location in the pedestrian mode. Thereby, in this embodiment, it is set that the current location may be intuitively grasped even when the display is switched between the normal mode and the pedestrian mode.

Also, the mark M1T without the directionality, which does not allow the user to recognize that a specific direction is a significant direction, is applied as the mark M1T indicating the current location in the pedestrian mode. Further, the detection of the traveling direction based on the change of the current location and the change of the direction of the map display based on the detected traveling direction are stopped. Thereby, in this embodiment, the erroneous display of the direction of the map by the erroneous detection of the traveling direction may be effectively prevented, thereby effectively preventing the erroneous display of the current location according to the traveling direction when used as the PND.

Also, instead of stopping to detect the traveling direction and to change the direction of the map display based on the detected traveling direction, the direction of the map is changed by the operation of the user (FIG. 6), thereby improving the usability for the user.

Also, in the navigation device 1, in the pedestrian mode, the setting of the destination is separately received and the mark M3T indicating the destination is displayed together (FIGS. 1 and 5). Also, the linear distance to the destination is sequentially displayed in response to the operation of the user. Thereby, in the navigation device 1, when visiting various facilities dotted in a vast site on foot, for example, the linear distance to the target facilities or the like may be confirmed on the map. Therefore, the user may select and change the facility to be visited next based on the display of the linear distance, and thereby, the navigation device 1 may improve the usability by simple configuration.

That is to say, in this case, it may be considered that the target facilities can be efficiently visited by searching the route and executing the navigation processing as in the case of the in-vehicle use. However, in this case, it is necessary to hold the information on each destination necessary for the route search, which results in that an amount of data to be stored in the read only memory 20 drastically increases. Also, since it is not necessarily based on the movement on the road on which a vehicle runs, the route search processing becomes significantly complicated, and it is not necessarily sure that the route may be appropriately detected. Thereby, it becomes necessary to execute significantly inefficient processes with a large-scale configuration.

However, when allowing the user to select the destination by sequentially displaying the direction of the destination and the linear distance as in this embodiment, it becomes possible to appropriately select the destination without executing such significantly inefficient processes with the large-scale configuration.

[Effect of Embodiment]

According to the above-described configuration, by displaying the map by arranging the mark of the current location on the current location corrected using the map matching in the normal mode, and by stopping the correction by the map matching in the pedestrian mode, the erroneous display of the current location when used as the PND may be prevented.

Also, by changing the direction of the map such that the traveling direction detected based on the change of the current location is in the upward direction to display in the normal mode, and by stopping to change the direction of the map according to the direction of the movement and by changing the direction of the map in response to the operation of the user in the pedestrian mode, the map display in an erroneous direction based on the erroneous detection of the traveling direction may be prevented.

Also, by applying the mark indicating the traveling direction as the mark indicating the current location in the normal mode, and by applying the mark without the directionality as the mark indicating the current location in the pedestrian mode, the current location may be intuitively correctly grasped even when switching the display between the normal mode and the pedestrian mode.

In addition, in the pedestrian mode, by receiving the setting of the destination and displaying the mark indicating the destination on the map, and by displaying the distance from the current location to the destination, the usability for the user when moving on foot may be improved.

Also, by sequentially selecting a plurality of destinations and setting the selected destination to be identifiable from other destinations, and by displaying the distance to the selected destination, it is possible to set so as to appropriately select the destination without executing significantly inefficient processes with the large-scale configuration.

[Second Embodiment]

Figure 7:
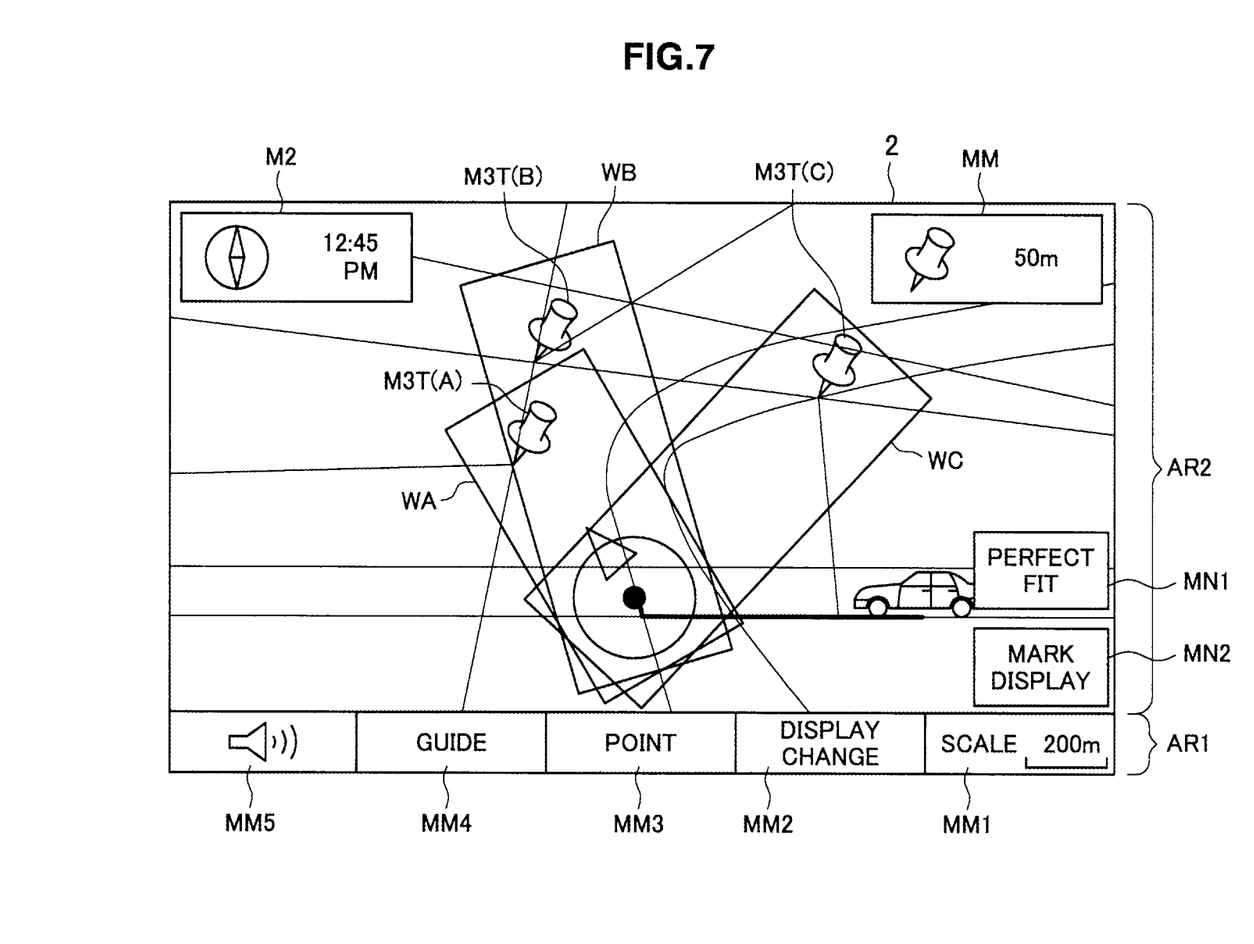
FIG. 7 is a plan view showing the display screen in the pedestrian mode of the navigation device according to a second embodiment of the present invention.

FIG. 7 is a plan view showing the map display of the navigation device according to a second embodiment of the present invention. In the navigation device, the map display shown in FIG. 7 is applied in place of the map display described above with reference to FIG. 1. In the map display shown in FIG. 7, a menu MN1 of "perfect fit" and a menu MN2 of "mark display" are provided on a right side of the display screen. The navigation device according to the second embodiment is configured in the same manner as the navigation device 1 of the first embodiment except that the configuration relating to the menus MN1 and MN2 is different.

In the same manner as the navigation device 1 of the first embodiment, the navigation device switches the operation mode of the display unit between the pedestrian mode and the normal mode, and receives the setting of the destination in the pedestrian mode.

The central processing unit of the navigation device displays the destination relating to the pedestrian mode by the mark M3T as the marker in response to the selection of the menu MN2 of "mark display", and switches the menu MN2 of "mark display" to the menu of "hide mark". Also, the display of the mark M3T as the marker is stopped in response to the selection of the menu of "hide mark".

When the mark M3T as the marker is displayed in response to the selection of the menu MN2 of the "mark display", the central processing unit 12 displays the menu MN1 of "perfect fit". The central processing unit 12 sequentially cyclically switches the display of the display screen 2 in response to the operation of the menu MN1 of "perfect fit".

That is to say, when the menu MN1 of "perfect fit" is operated, the central processing unit 12 detects the linear distance from the current location to a plurality of destinations relating to the mark M3T as the displayed marker, and detects the destination having the shortest linear distance. Also, the scale, the direction and the location of the map are changed as a shape of the display screen indicated by a symbol WA in FIG. 7, and the map is displayed by arranging the mark M3T(A) as the marker corresponding to the destination having the shortest distance and the mark M1 of the current location on both ends in a longitudinal direction of the display screen.

When the menu MN1 of "perfect fit" is subsequently operated, the destination having next shortest linear distance is subsequently selected. Also, as for a mark M3T(B) of the marker relating to the selected destination, the scale, the direction and the location of the map are changed as a shape of the display screen indicated by a symbol WB, and the map is displayed by arranging the mark M3T(B) as the marker and the mark M1 of the current location on both ends in the longitudinal direction of the display screen.

Also, when the menu MN1 of "perfect fit" is subsequently operated, the destination having next shortest linear distance is subsequently selected. Also, as for the mark M3T(C) as the marker relating to the selected destination, the scale, the direction and the location of the map are changed as indicated by a symbol WC, and the map is displayed by arranging the mark M3T(C) as the marker and the mark M1 of the current location on both ends in the longitudinal direction of the display screen.

Also, when the selection of the destinations takes a round, the scale, the direction and the location of the map are changed by the operation of the menu MN1 of "perfect fit" to return to the original display screen. The central processing unit 12 repeats the displays in response to the operation of the menu MN1 of "perfect fit". Accordingly, the central processing unit 12 alternately repeats separate display of a plurality of destinations and an entire display of a plurality of destinations. In the separate display of the destinations, a plurality of destinations are sequentially selected, and the selected destination and the current location are separately displayed in detail. The order of selection of the destinations may be in the decreasing order of the linear distance in place of the increasing order of the linear distance, and may be in the increasing order of the angle to rotate the map.

In this case, the central processing unit 12 gradually changes the scale, the direction and the location in a certain transition time to switch the display, thereby making the relation between displays be further grasped. As indicated by the symbols WA to WC in FIG. 7, it may be configured so that the area displayed in the separate display is indicated by a frame shape in the entire display, thereby making the relation between displays be further grasped. Also, the switch of the display by the menu MN2 of the "mark display" and the menu of "hide mark" may be included in the switching of the display by the menu MN1 of "perfect fit" and the entire display, the separate display, and non-display of the mark of the marker may be sequentially cyclically executed. Also, only the separate display may be sequentially cyclically executed.

In this embodiment, a course from the current location to each destination and the like may be individually examined in detail by sequentially selecting a plurality of destinations, changing the scale, the direction and the display location, and arranging the mark indicating the selected destination and the mark indicating the current location on positions on both ends in the longitudinal direction of the display screen. Thereby, the usability for the user may be further improved.

Also, by switching such separated display and entire display, it is possible to switch the display as needed, thereby improving the usability for the user.

The present application contains subject matter related to that disclosed in Japanese Priority Patent Application JP 2008-225548 filed in the Japan Patent Office on Sep. 3, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

For example, a case of switching the operation between the normal mode and the pedestrian mode by the selection of the menu by the user has been described in the above-described embodiment. However, the present invention is not limited thereto, and it is also possible to detect the mounting on the cradle and the removal from the cradle to switch the normal mode and the pedestrian mode based on the detection result.

Although a case in which the present invention is applied to the car navigation device, which may be used as the PND, is described in the above-described embodiments, the present invention is not limited thereto and it may be widely applied to a portable phone or the like having a navigation function, for example.

The present invention may be applied to the car navigation device, which may be used as the PND, for example.

What is claimed is:

1. A navigation device, comprising:
a current location detection unit to detect a current location;
a current location correction unit to correct the current location detected by the current location detection unit using map matching; and
a display unit to display a map,
wherein the navigation device switches an operation mode of the navigation device between a normal mode and a pedestrian mode,
wherein the normal mode is an operation mode based on in-vehicle use,
wherein the pedestrian mode is an operation mode based on use when moving on foot,
wherein, when the navigation device is in the normal mode, the navigation device displays the map of the current location in the display unit by arranging a mark indicating the current location based on the current location corrected by the current location correction unit,
wherein, when the navigation device is in the pedestrian mode, the navigation device displays the map of the current location in the display unit by arranging the mark indicating the current location based on the current location detected by the current location detection unit; and
receives a setting of a plurality of destinations in the pedestrian mode,
displays a mark indicating the plurality of destinations on the map, and
sequentially selects respective destinations of the plurality of destinations, sets the selected destination to be identifiable from other destinations of the plurality of destinations, and displays a distance to the selected destination.

2. The navigation device according to claim 1, comprising:
traveling direction detecting means for detecting a traveling direction based on change of the current location detected by the current location detection unit, or change of the current location corrected by the current location correction unit,
wherein the navigation device
in the normal mode, changes a direction of the map based on the traveling direction detected by the traveling direction detecting means, and holds the direction on the map corresponding to the traveling direction detected by the traveling direction detecting means in an upward direction of the display screen, and
in the pedestrian mode, stops changing the direction of the map according to the traveling direction, and changes the direction of the map in response to the operation of the user for display.

3. The navigation device according to claim 2, wherein a mark indicating the current location in the normal mode is a mark indicating the traveling direction, and a mark indicating the current location in the pedestrian mode is a mark without directionality.

4. The navigation device according to claim 1, wherein the navigation device
receives a setting of a destination in the pedestrian mode, and
displays a mark indicating the destination on the map and displays a distance from the current location to the destination.

5. The navigation device according to claim 1, wherein the navigation device receives a setting of a plurality of destinations in the pedestrian mode, sequentially selects respective destinations of the plurality of destinations, and changes a scale, a direction and a display location of the map, and displays the map by arranging a mark indicating the selected destination and a mark indicating the current location on positions on both ends in a longitudinal direction of a display screen.

6. The navigation device according to claim 1, wherein the navigation device
receives a setting of a plurality of destinations in the pedestrian mode,
alternately executes a separate display of a destination of the plurality of destinations and an entire display of all of the plurality of destinations,
in the separate display:
displays a mark indicating the plurality of destinations on the map,
sequentially selects respective destinations of the plurality of destinations,
changes a scale, a direction and a display location of the map, and displays the map by arranging a mark indicating the selected destination and a mark indicating the current location on positions on both ends in a longitudinal direction of the display screen, and in the entire display:
changes the scale, the direction and the display location of the map, and displays the marks indicating the plurality of destinations and the current location on the display screen.

7. A display method of a navigation device having a current location detection unit to detect a current location, a current location correction unit to correct the current location detected by the current location detection unit using map matching, and a display unit to display a map, the method comprising:
an operation mode switching step of switching an operation mode of the display unit between a normal mode, being an operation mode based on in-vehicle use, and a pedestrian mode, being an operation mode based on use when moving on foot;
a normal mode map displaying step of displaying, when in the normal mode, the map of the current location by the display unit by arranging a mark indicating the current location based on the current location corrected by the current location correction unit; and
a pedestrian mode map displaying step of displaying, when in the pedestrian mode, the map of the current location by the display unit by arranging the mark indicating the current location based on the current location detected by the current location detection unit;
receiving a setting of a plurality of destinations in the pedestrian mode;
displaying a mark indicating the plurality of destinations on the map; and sequentially selecting respective destinations of the plurality of destinations;
setting a selected destination to be identifiable from other destinations of the plurality of destinations; and
displaying a distance to the selected destination.

8. A system for performing a display method of a navigation device, comprising:
a navigation device comprising:
a current location detection unit to detect a current location;
a current location correction unit to correct the current location detected by the current location detection unit using map matching;
a display unit to display a map;
wherein the navigation device receives a setting of a plurality of destinations in the pedestrian mode, displays a mark indicating the plurality of destinations on the map, and sequentially selects respective destinations of the plurality of destinations, sets the selected destination to be identifiable from other destinations of the plurality of destinations, and displays a distance to the selected destination;
a calculation unit for executing the program of the display method to control operation of each unit; and
a processor to perform a display method configured for:
an operation mode switching step of switching an operation mode of the display unit between a normal mode being an operation mode based on in-vehicle use and a pedestrian mode being an operation mode based on use when moving on foot;
a normal mode map displaying step of displaying, when in the normal mode, the map of the current location by the display unit by arranging a mark indicating the current location based on the current location corrected by the current location correction unit; and
a pedestrian mode map displaying step of displaying, when in the pedestrian mode, the map of the current location by the display unit by arranging the mark indicating the current location based on the current location detected by the current location detection unit.

9. A recording medium, not including transitory signals, for recording a program of a display method of a navigation device, wherein the navigation device has a current location detection unit to detect a current location, a current location correction unit to correct the current location detected by the current location detection unit using map matching, a display unit to display a map, and a calculation unit for executing the program of the display method to control operation of each unit, and the display method comprising:
an operation mode switching step of switching an operation mode of the display unit between a normal mode being an operation mode based on in-vehicle use and a pedestrian mode being an operation mode based on use when moving on foot, a normal mode map displaying step of displaying, when in the normal mode, the map of the current location by the display unit by arranging a mark indicating the current location based on the current location corrected by the current location correction unit, and
a pedestrian mode map displaying step of displaying, when in the pedestrian mode, the map of the current location by the display unit by arranging the mark indicating the current location based on the current location detected by the current location detection unit
receiving a setting of a plurality of destinations in the pedestrian mode;
displaying a mark indicating the plurality of destinations on the map; and
sequentially selecting respective destinations of the plurality of destinations.
setting a selected destination to be identifiable from other destinations of the plurality of destinations; and
displaying a distance to the selected destination.

* * * * *